US010154748B2

(12) United States Patent
Pennella

(10) Patent No.: US 10,154,748 B2
(45) Date of Patent: Dec. 18, 2018

(54) REGENERATION HOUSEHOLD MACHINE FOR REGENERATING PACKAGED COOKED AND SUBSEQUENTLY COOLED TO CHILLED, AMBIENT OR FROZEN TEMPERATURES PORTIONS OF FOOD AND METHOD CARRIED OUT BY SAID MACHINE

(71) Applicant: Nutresia SA, Chatel-St-Denis (CH)

(72) Inventor: Jonathan Pennella, Blonay (CH)

(73) Assignee: Nutresia SA, Chatel-St-Denis (CH)

( * ) Notice: Subject to any disclaimer, the term of this patent is extended or adjusted under 35 U.S.C. 154(b) by 0 days.

(21) Appl. No.: 14/434,480

(22) PCT Filed: Oct. 7, 2013

(86) PCT No.: PCT/EP2013/070763
§ 371 (c)(1),
(2) Date: Apr. 9, 2015

(87) PCT Pub. No.: WO2014/056814
PCT Pub. Date: Apr. 17, 2014

(65) Prior Publication Data
US 2015/0265090 A1    Sep. 24, 2015

(30) Foreign Application Priority Data

Oct. 10, 2012 (EP) .................................... 12187993

(51) Int. Cl.
*A47J 27/10* (2006.01)
*A47J 27/04* (2006.01)
(52) U.S. Cl.
CPC ............... *A47J 27/10* (2013.01); *A47J 27/04* (2013.01); *A47J 2027/043* (2013.01)
(58) Field of Classification Search
CPC ....... A47J 27/10; A47J 27/04; A47J 2027/043
(Continued)

(56) References Cited

U.S. PATENT DOCUMENTS 4,246,955 A * 1/1981 Skala .................. A47J 27/16
165/104.14
4,752,490 A * 6/1988 Dreano ................ A23L 1/0121
426/407

(Continued)

FOREIGN PATENT DOCUMENTS

CN    101427884 A    5/2009
CN    102665495 A    9/2012
(Continued)

OTHER PUBLICATIONS

International Search Report and Written Opinion dated Oct. 28, 2013.
(Continued)

*Primary Examiner* — Ibrahime A Abraham
*Assistant Examiner* — Biniam Asmelash
(74) *Attorney, Agent, or Firm* — Husch Blackwell LLP

(57) ABSTRACT

The invention concerns a regeneration household machine (10) for regenerating packaged cooked and subsequently cooled to chilled, ambient or frozen temperatures portions of food. The machine (10) comprises at least one compartment (16, 18) adapted to receive, preferably when it is empty, at least one packaged cooked and subsequently cooled to chilled, ambient or frozen temperatures portion of food to be regenerated and at least one conduct (65, 65b, 65c, 68a, 69, 69a, 69b) for feeding a heating fluid into said at least one compartment (16, 18), heating means (72) being provided at said at least one conduct in order to heat said heating fluid at a desired temperature depending on the recipe of the food of said at least one packaged cooked and subsequently cooled to chilled, ambient or frozen temperatures portion of food. The machine further comprises recognition means for recognizing the recipe of the food of a specific packaged cooked and subsequently cooled to chilled, ambient or frozen temperatures portion of food inserted into said at least (Continued)

one compartment (16, 18) and a control unit (20) which automatically sets said machine (10) to operate with a predetermined heating cycle depending on the recipe of said specific packaged cooked and subsequently cooled to chilled, ambient or frozen temperatures portion of food.

7 Claims, 2 Drawing Sheets

(58) Field of Classification Search
USPC .......................................... 99/330, 483, 486
See application file for complete search history.

(56) References Cited

U.S. PATENT DOCUMENTS

| | | | | |
|---|---|---|---|---|
| 5,280,748 | A * | 1/1994 | Pardo | A23L 3/10 |
| | | | | 99/330 |
| 5,281,426 | A * | 1/1994 | Pardo | A23L 3/10 |
| | | | | 426/232 |
| 5,321,232 | A * | 6/1994 | Ogle | F24C 7/087 |
| | | | | 219/494 |
| 5,445,062 | A * | 8/1995 | Polster | A47J 27/10 |
| | | | | 366/107 |
| 5,542,344 | A * | 8/1996 | Koether | A23L 3/375 |
| | | | | 392/445 |
| 6,063,421 | A * | 5/2000 | Barravecchio | A47J 27/18 |
| | | | | 426/231 |
| 6,619,189 | B1 * | 9/2003 | Tippmann | A23L 3/00 |
| | | | | 126/20 |
| 9,220,362 | B2 * | 12/2015 | Eades | A47J 27/004 |
| 2004/0074401 | A1 * | 4/2004 | McMaster | A23L 1/0073 |
| | | | | 99/485 |
| 2006/0185810 | A1 * | 8/2006 | Juergens | A47J 39/006 |
| | | | | 162/234 |
| 2007/0029306 | A1 | 2/2007 | Chun et al. | |
| 2007/0062377 | A1 * | 3/2007 | Stieger | A47J 31/007 |
| | | | | 99/279 |
| 2008/0066624 | A1 * | 3/2008 | Taylor | A47J 27/10 |
| | | | | 99/330 |
| 2008/0075821 | A1 * | 3/2008 | Lagares Corominas | A23L 1/0121 |
| | | | | 426/509 |
| 2010/0034935 | A1 * | 2/2010 | Wally | A47J 37/00 |
| | | | | 426/232 |
| 2010/0143544 | A1 * | 6/2010 | Narumiya | A21C 15/00 |
| | | | | 426/95 |
| 2011/0003039 | A1 * | 1/2011 | Fox | A47J 27/10 |
| | | | | 426/88 |
| 2011/0217439 | A1 * | 9/2011 | Morandotti | A23L 1/0121 |
| | | | | 426/510 |
| 2012/0251695 | A1 * | 10/2012 | Neff | A23L 1/0128 |
| | | | | 426/509 |
| 2015/0017297 | A1 * | 1/2015 | Vastardis | A47J 31/002 |
| | | | | 426/429 |

FOREIGN PATENT DOCUMENTS

| | | |
|---|---|---|
| FR | 2613590 A1 | 10/1988 |
| JP | 02-142182 | 11/1990 |
| JP | 3086394 U | 6/2002 |
| JP | 2002-272604 A | 9/2002 |
| JP | 2004-332955 A | 11/2004 |
| JP | 2005-198552 A | 7/2005 |
| JP | 2007-24487 A | 2/2007 |
| JP | 2007-252580 A | 10/2007 |
| JP | 2011-43259 A | 3/2011 |
| WO | 2011/031306 A2 | 3/2011 |

OTHER PUBLICATIONS

Japanese Office Action dated Apr. 5, 2016, issued in corresponding Japanese Application.

Chinese Office Action dated Apr. 28, 2016, issued in corresponding Chinese Application.

Japanese Office Action dated Aug. 23, 2016, issued in corresponding Japanese Application.

* cited by examiner

REGENERATION HOUSEHOLD MACHINE FOR REGENERATING PACKAGED COOKED AND SUBSEQUENTLY COOLED TO CHILLED, AMBIENT OR FROZEN TEMPERATURES PORTIONS OF FOOD AND METHOD CARRIED OUT BY SAID MACHINE

CROSS REFERENCE TO RELATED APPLICATION

This application is a U.S. National Phase Application of International Application PCT Application No. PCT/EP2013/070763 filed on Oct. 7, 2013, which claims the benefit of priority from European Patent Application No. 12187993.6 filed on Oct. 10, 2012. The disclosures of International Application PCT Application No. PCT/EP2013/070763 and European Patent Application No. 12187993.6 are incorporated herein by reference.

The present invention relates to a regeneration household machine for regenerating packaged cooked and subsequently cooled to chilled, ambient or frozen temperatures portions of food.

Furthermore, the present invention relates to a method for regenerating packaged cooked and subsequently cooled to chilled, ambient or frozen temperatures portions of food, said method being carried out by the abovementioned regeneration household machine.

The regeneration process carried out by the abovementioned regeneration household machine is based on the so called "sous-vide" method.

"Sous-vide" is the French expression for "under-vacuum" and it finds several forms of applications:
1) "sous-vide conditioning", wherein cooked or raw food are kept in nearly airtight bags, so as to allow easier and cleaner storage;
2) "sous-vide cooking", wherein for example culinary bases for a meal, which are packaged raw into vacuum sealed plastic bags, are then cooked in a water bath or in a steam oven at low temperatures (usually in a range comprised between 56° C. and 93° C.) or rather at their specific right cooking temperatures for a predetermined time (from few minutes up to, sometime, more than one hundred hours).
3) "sous-vide pasteurization", wherein food—cooked under any cooking method—can be packaged into a vacuum sealed plastic bag and then heated by using a combination of temperature and time, in order to reduce the bacteria count of the food (pasteurization). If the food is cooked by using the sous-vide cooking, most of the times it would already be pasteurized as the time of exposure to a certain temperature would most likely be sufficient to pasteurize the food. Both sous-vide cooked and pasteurized food is then cooled and kept at chilled temperatures, which allows to significantly increase the shelf life of the food thanks to the clean and oxygen free environment inside the vacuum sealed plastic bag.

"Sous-vide regeneration" of food is also known, wherein both sous-vide cooked food and sous-vide pasteurized food is then reheated for final consumption.

In the above-mentioned "sous-vide regeneration", reheating can take place under any heating method, by using a conventional oven, a microwave oven, a casserole or in a "bain-marie" (French expression for "water bath"). In order to maintain all nutriments, vitamins and organoleptic properties in terms of taste, colour and texture, the best solution would be to reheat every single food or meal component to reach the "right temperature" at the heart of that food or meal component.

The specificities of both optimal sous-vide cooking and regeneration are described below in a bit more detail.

An optimal sous-vide cooking allows obtaining a desired uniformity of temperature at the heart of the food. Thanks to years of research, temperature tables have been established which describe both micro-biological and organoleptic properties for groups of food. Subsequently, reference values in terms of temperatures at the heart of food, or in terms of heating time and temperatures, or in term of sets of heating times at different temperatures, have been established for each group of food, in order to obtain the highest organoleptic properties and food safety level complying with the laws and regulations in force.

Sous-vide regeneration also requires great care in terms of heating times and temperatures. The impact of the regeneration on food quality at the regeneration stage is of the same importance as that at the cooking stage. Only a few degrees Celsius of difference at the heart of a food at the regeneration stage can totally destroy or materially change the organoleptic properties of the food itself, which have been carefully created at the cooking stage.

For instance, a steak cooked industrially according to the above-mentioned tables of optimal sous-vide cooking for a blue colour at the heart at serving, will be blue if it is regenerated at 56° C. at the heart indeed. Instead, if it is regenerated at 58° C., it will already turn rare and, if it is regenerated at 60° C., it will turn medium rare. Furthermore, a certain type of fish perfectly cooked at 56° C. at the heart, according to optimal sous-vide cooking tables, will have a perfect texture if it is regenerated at 56° C. at the heart, but it will be totally dry and loose most of its taste if it is regenerated at 68° C. at the heart. When a pan, a microwave oven or a conventional oven is used, such differences in temperatures occur very easily, sometimes in just a few seconds or because of a slight variation in precision of temperature setting, or because of a slight variation of the settled heat power(in the case of a microwave oven).

The above-mentioned need for great precision at the regeneration stage has discouraged many manufacturers of food to apply the optimal sous-vide cooking temperature tables at the cooking stage in the industrial production of food. Indeed, without a perfect regeneration stage, the consumers in most cases would not notice any difference between food produced according to conventional industrial production methods (that is temperatures above 63° C.) and food produced according to the optimal sous-vide cooking temperature tables (that is temperatures in the range between 56° C. and 93° C.), because this difference is in most cases much reduced or totally destroyed during the regenerating stage in a conventional oven, a microwave oven or a pan. Additionally, it is easier to establish the necessary food safety compliance documentation when food is produced according to conventional industrial production methods, than when optimal sous-vide cooking temperature tables are used.

Prior art exists in terms of both appliances for sous-vide cooking as well as for sous-vide vide method.

WO 2011/031306 discloses a sous-vide household cooker for food. The sous-vide cooker comprises a cooking compartment and a heating system for water which is circulated in said cooking compartment. The heating system comprises a heating unit, temperature sensors, a proportional-integral-derivative controller and a control panel. The user sets on the control panel a specific cooking temperature and a specific cooking time which have to be chosen by the consumer in relation to the type and quantity of food inserted into the cooking compartment. Then the heating unit maintains a constant water temperature in the cooking compartment during the cooking.

The above document discloses a manual setting by the consumer of the sous-vide cooker in relation to the food to be cooked.

FR 2 613 590 discloses a module for cooking and cooling foods cooked in a packaging under vacuum. The module comprises a heat-insulated enclosure, a first independent circuit for supplying cooking water at a regulated temperature, and a second independent circuit for supplying coolant water at a regulated temperature. The first independent circuit comprises a hot-water generator connected in a closed loop to the said enclosure, as well as to a network for distribution of cold water via an electrovalve (solenoid valve), a water circulator and a thermostatic probe interposed in said closed loop. The second independent circuit comprises a cold-water generator connected in a closed loop to said enclosure, said loop having, with the closed loop of the hot circuit, a common part in which said water circulator and the cold-water distribution network are located and which is equipped with a thermostatic probe. Means for automatic command and control of the cooking and cooling times and temperatures are provided.

The technical problem at the basis of the present invention is that of providing a regeneration household machine which is capable of regenerating packaged cooked and subsequently cooled to chilled, ambient or frozen temperatures portions of food allowing high organoleptic properties of the food not to be destroyed as well as a sure food safety level to be obtained in a way extremely simple for the consumer.

The present invention relates to a regeneration household machine for regenerating packaged cooked and subsequently cooled to chilled, ambient or frozen temperatures portions of food having the features recited in claim 1. Furthermore, the present invention relates to a method for regenerating packaged cooked and subsequently cooled to chilled, ambient or frozen temperatures portions of food by the abovementioned regeneration household machine, as recited in claim 10.

The above technical problem and the solution thereto recited in the abovementioned claims can be fully understood by describing the differences between the prior art and the regeneration household machine of the invention. The main difference is that the machine of the invention is the first household appliance for regeneration of food only. This implied the development of a totally new appliance that in its technical design and operating method is fundamentally different mainly on two points from the prior art:

1) The prior art uses a heating system that heats cold water inside a compartment. Once the water is at the temperature set by the user, the machine will inform the user. The later can then insert the food and cook or regenerate. Alternatively, putting the food directly into cold water would jeopardize food safety (bacteria build up during heating time), food quality (softening of the texture) and taste (the pathogens developed during the cooling stage, that is below 52° C., could alter taste).

For a household appliance for regeneration only, as the one of the present invention, user-friendliness is of utmost importance. The regeneration household machine of the invention therefore uses a totally different system that heats cold water in the conduct upstream the compartment; the user can thus put cold food into empty compartment and the appliance will then pump and instantaneously heat water at the desired temperature before injecting it into the compartment with the cold food. Thus it can operate with one consumer intervention only rather than two as required in the prior art.

2) As mentioned above the tables of optimal sous-vide cooking temperatures which are valid for both cooking and regeneration vary by the type of food used. Thus each food component should be heated based on its specific type. A household appliance composed of several compartments of the prior art would theoretically do nearly the same, but it would not find a market due to its size and complexity to operate.

The regeneration household machine of the present invention therefore needed different compartments each being able to operate individually and independently to regenerate each meal component at the right temperature. Preferably, the machine comprises an electronic board capable of managing the heating times of each compartment so that a meal or multiple portions of a meal or multiple meals inserted into the machine at the same time are heated for different lengths of time but all to be ready at the same time for warm consumption. This feature is recited in dependent claims 2 and 12.

Further preferred features of the invention are recited in the other claims.

Throughout the present description and the following claims, the expression "recipe" is used to indicate the desired heating temperature and the desired heating time for a specific quantity (portion) of a specific type of food, according to the abovementioned tables of optimal sous-vide cooking.

Characteristics and advantages of the present invention shall become clearer from the following detailed description of a preferred embodiment thereof, made with reference to the attached drawings and given as an indication and not for limiting purposes. In such drawings.

Figure 1:
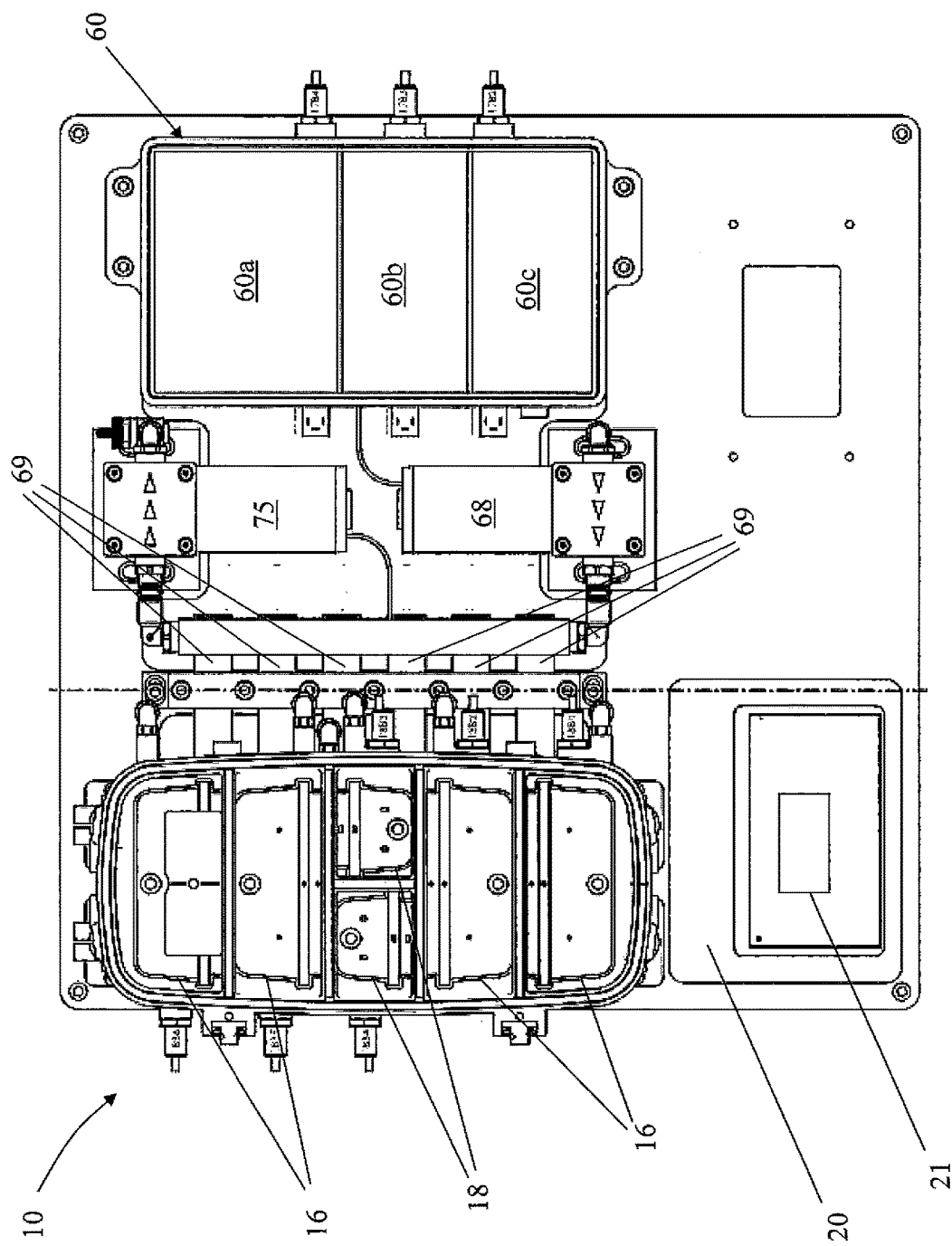
FIG. 1 is a schematic plant view of a regeneration household machine according to the invention.

With initial reference to FIG. 1, a regeneration household machine for regenerating packaged cooked and subsequently cooled to chilled, ambient or frozen temperatures portions of food in accordance with the invention is schematically shown. Such a machine is globally indicated with reference numeral 10.

In particular, the machine 10 is intended for a domestic use. However it can be also used in restaurant or more generally in any food service environment.

The packaged cooked and subsequently cooled to chilled, ambient or frozen temperatures portions of food to be regenerated by the machine 10 include respective foods, for example culinary bases for a meal, which have been previously sous-vide cooked or sous-vide pasteurized and then stored cooled to chilled, ambient or frozen temperatures. These are herein also referred to as "packaged portions of food".

In order to be eaten, the packaged portions of food must be heated in the machine 10 according to a specific respective recipe, that is according to a heating cycle which depends on type and/or quantity of the culinary bases (herein also referred to as "food") packaged in said packaged portions of food. The temperatures reached in the heating cycle are generally comprised in a range between 56° C. and 100° C., preferably between 56° C. and 93° C., so that a sous-vide regeneration process is carried out. It is however encompassed an embodiment of the invention wherein the temperatures reached in the heating cycle are lower than 56° C.

In the non limiting example of FIG. 1, the machine 10 comprises six compartments 16, 18 for receiving said packaged portions of food. Four compartments 16 have a first volume and two compartments 18 have a second volume smaller than the compartments 16.

The compartments 16, 18 are adapted to receive packaged portions of food of two different sizes. In particular, the machine 10 can receive four packaged large portions of food and two packaged small portions of food, wherein the packaged large portion of food includes more food than (for example twice) the packaged small portions of food. Preferably, the packaged portions of food have substantially the same shape (for example, a substantially parallelepiped shape).

The compartments 16 can receive the packaged large portions of food while the compartments 18 can receive the packaged small portions of food.

Figure 2:
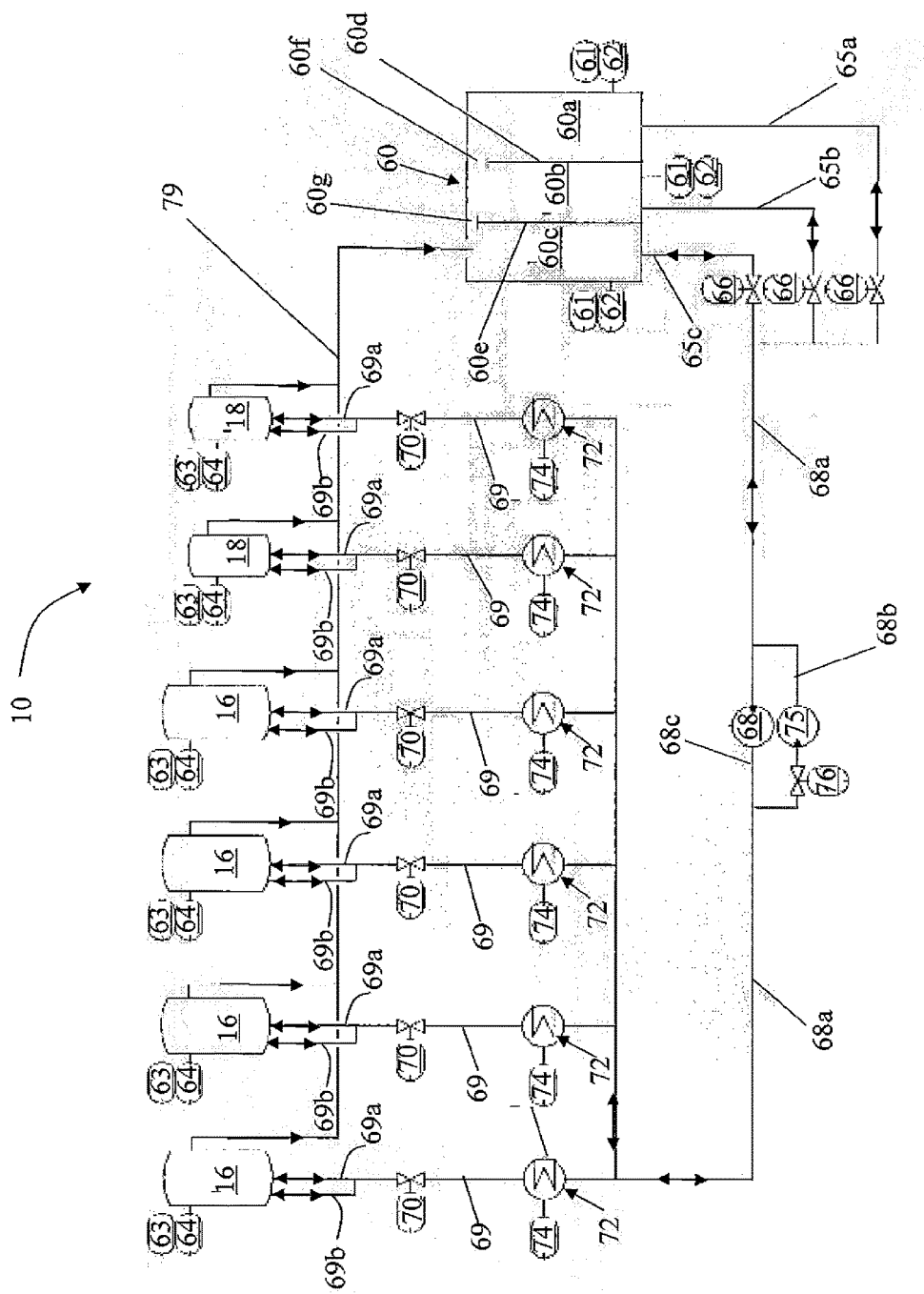
FIG. 2 is a functional diagram of the regeneration household machine of FIG. 1.

As shown in FIG. 2, each compartment 16, 18 is provided with respective temperature sensors 63 and level sensors 64.

Between the packaged portions of food and the internal surface of the compartments 16, 18 in which they are respectively received, interspaces are provided, so that a heating fluid can suitably surround the packaged portions of food. Preferably, the heating fluid is water and/or steam and/or saturated air (i.e. air saturated by humidity) and/or air with very high humidity level (preferably, over 80% of humidity level).

The machine 10 further comprises a control unit 20 for setting the operation of the machine 10 itself.

The machine 10 also comprises recognition means (not shown) for recognising the type and/or quantity of food packaged in the packaged portions of food which are received in the compartments 16, 18. Advantageously, through the recognition means, the machine 10 is automatically set to carry out the most suitable specific heating cycle for the specific type, and preferably quantity too, of food of the packaged portions of food which have been inserted in the compartments 16, 18 and properly recognised. The recognition means can comprise a bar code, optical character, magnetic strip or Radio Frequency Identification (so-called RFID) reader for respective tags associated to the packaged portions of food.

Furthermore the recognition means can comprise means for recognising only the packaged portions of food produced by the manufacturer of the machine 10.

The recognition means are in communication with said control unit 20. As stated above, the control unit 20 automatically sets the machine 10 in order to heat the packaged portions of food received in the compartments 16, according to a specific heating cycle thereof which depends on the recipe of each packaged portion of food.

Preferably, the control unit automatically sets the machine 10 in order to start heating of different packaged portions of food (that is packaged portions of food containing different type and/or quantity of food) according to the respective heating cycle at different time, if needed, so that the heating cycles of all the packaged portions of food inserted into the compartments 16, 18 substantially end at the same time. In this way, it is advantageously possible to allow a warm consumption of the different packaged portions of food at the same time.

Each packaged portion of food is preferably packaged under-vacuum in a respective bag.

In operation, the packaged portions of food are inserted by the user in the compartments 16, 18 when these are empty. In order to heat the packaged portions of food, the machine 10 supplies into the compartments 16, 18 the heating fluid (for example water) heated at a desired temperature, this temperature depending on the recipe of the packaged portions of food to be heated. Depending on the recipe of the packaged portions of food, the machine 10 can supply into the compartments 16, 18 at first steam and, successively, water heated at the desired temperature. In further embodiments of the invention, air saturated by humidity (i.e. saturated air) or air with very high humidity level is used instead of steam. In other embodiments of the invention, only hot water or only steam or only saturated air or only air with very high humidity level is supplied into the compartments 16, 18. In general, the compartments 16, 18 can be supplied with only one of above-mentioned heating fluids (i.e. water, steam, saturated air, air with very high humidity level), or with any combination thereof.

In a preferred embodiment of the invention, the machine 10 further comprises a user interface 21 by which a user can modify the heating cycle automatically set by the control unit 20 after the recognition means have recognised the packaged portion of food inserted into the compartments 16 or 18. In a different embodiment, through the user interface 21 the user can input a parameter in order to choose one among different heating cycles automatically set by the control unit 20 after the recognition of the packaged portion of food has been carried out by said recognition means.

Said user interface 21 comprises a selector (not shown), for example one or more buttons. In the case wherein said packaged portion of food is meat, the selector is used to select for example four different heating cycles in order to obtain blue, red, medium or well done regenerated meat.

In a preferred embodiment of the invention, the machine 10 comprises a tank 60 for water. The tank 60 lacks heating means and is preferably subdivided in at least two different portions by at least one inner wall. In the non limiting example of FIG. 1, the tank 60 comprises three portions 60a, 60b and 60c and two inner walls 60d and 60e. As it will be better explained below, the portion 60c is provided to contain hot water, portion 60b is provided to contain water at a medium temperature and portion 60a is provided to contain cold water.

The inner wall 60e separates the portion 60c from the portion 60b, and the inner wall 60d separates the portion 60b from the portion 60a. The inner walls 60d and 60e do not extended for all the height of the tank 60, so that top passages 60f and 60g are provided between the portion 60b and the portion 60a and between the portion 60c and the portion 60b, respectively.

Furthermore, the inner wall 60e is higher than the inner wall 60d so that, when water is added into the portion 60c, this water can overflow from the portion 60c into the portion 60b and then into the portion 60a, as will be described below.

The portions 60a, 60b and 60c of the tank 60 are in fluid communication with the compartments 16 and 18 through conducts which are described below.

As shown in FIG. 2, each portion 60a, 60b and 60c is provided with respective temperature sensors 61 and level sensors 62.

Water tanks of different sizes and/or without the aforementioned inner portions 60a, 60b and 60c can be used in place of the water tanks 60 described above.

In an embodiment of the invention, the machine 10 does not comprise any water tank. In this case tap water is supplied to the machine 10. In another embodiment of the invention, the water tank is very small, so that it must be refilled with fresh water at each heating cycle.

In the embodiment of the attached figures, conducts 65a, 65b and 65c are connected to the three portions 60a, 60b and 60c, respectively. Each conduct 65a, 65b and 65c comprise a valve 66, preferably an electrovalve.

The three conducts 65a, 65b and 65c are connected to a main conduct 68a wherein a charge pump 68 is arranged. The charge pump 68 is adapted to take the water out of the tank 60 and to send this water (or steam, as explained below) to each compartment 16, 18 through conducts 69, each connected to a respective compartment 16, 18.

Preferably, as shown in FIG. 2, in proximity of the compartments 16, 18, each conduct 69 bifurcates into two distinct conducts 69a, 69b connected to respective holes at the bottom portion of the compartments 16, 18.

The machine 10 further comprises a plurality of heating means 72, each arranged at a respective conduct 69. Preferably, the heating means 72 are electrical resistances.

Each heating means 72 is provided with a respective temperature sensor 74.

Each conduct 69 comprises a valve 70, preferably an electrovalve, arranged downstream of the respective heating means 72.

By operating on the valves 66 of the conducts 65a, 65b, 65c, it is possible to send water (or steam, as explained below) from portions 60a, 60b, 60c, respectively, of the tank 60 to the compartments 16, 18 through the main conduct 68a and the conducts 69, 69a, 69b.

The Applicant has found that the machine 10 can advantageously operate with heating means 72 having a power of about 450 W to 480 W, depending on the power supply (which can vary from 220 V to 240 V), wherein the volume of the large compartments 16 is about twice the volume of the small compartments 18 (for example, large compartments 16 have a volume of about 0.4 liters, preferably 0.38 liters, and small compartments 18 have a volume of about 0.2 liters, preferably 0.19 liters). Preferably, the large packaged portions of food to be inserted in the large compartments 16 have a volume which is about three time the volume of the small packaged portions of food to be inserted in the small compartments 18. More preferably, the large packaged portions of food have a volume of 0.3 liters while the small packaged portions of food have a volume of 0.11 liters. Furthermore, the tank 60 can have a volume of about 4 liters and the charge pump 68 can have a delivery capacity up to about 3 liters per minute and a pressure in a range between 1 and 6 bar. The three portions 60a, 60b and 60c of the tank 60 can have a volume of about 1.6 liters, 1.2 liters and 1.2 liters, respectively.

The conducts 69a, 69b, 69, 68a, 65a, 65b and 65c are also used for discharging the water contained in the compartments 16, 18 at the end of each regeneration process. This water is discharged into the tank 60 through a by-pass conduct 68b connected to the main conduct 68a upstream and downstream the charge pump 68. A discharge pump 75 and a valve 76, preferably an electrovalve, are arranged on the by-pass conduct 68b to allow the water from the compartments 16, 18 to go into the tank 60 through the conduct 68b, that is by-passing the portion 68c of the conduct 68a where the charge pump 68 is located.

Furthermore, each compartment 16, 18 comprises a respective overload output for discharging water in case of an excessive filling of the compartments 16, 18. All the overload outputs are provided at the top of the compartments 16, 18 and are in fluid communication with the tank 60, in particular with the portion 60c thereof, through an overload conduct 79.

In a different embodiment of the invention, the machine 10 is provided with two electrical resistances that simply provide hot water (no steam) at the desired temperature. Of course, different embodiments of the machine with a different number of heating means can be envisaged.

Herein below, the operation of the machine 10 provided with water as heating means is described.

In operation, packaged portions of food are inserted into the compartments 16, 18 of the machine 10 when the compartments 16, 18 are empty.

Then the compartments 16, 18 are filled with water coming from the tank 60 and heated at a desired temperature by the electrical resistances 72, or with steam produced by the electrical resistances 72. The use of steam or water and the desired temperature at which the water is heated depends on the recipes of the foods of the specific packaged portions of food inserted into the compartments 16, 18. The packaged portions of food are thus heated by said previously heated water or steam for a desired time. Also this time depends on the recipes of the foods of the specific packaged portions of food inserted into the compartments 16, 18.

In the non limiting example of the figures, the machine 10 is automatically set to operate, once the packaged portions of food are inserted into the compartments 16, 18 and after the heated water or steam is inserted into the compartments 16, 18, for a predetermined first heating time at the compartments 16 and for a predetermined second heating time at the compartments 18, so that the first and second heating cycles substantially end at the same time. Accordingly, the compartments requiring a longer heating time are fed with the heated water before the compartments requiring a shorter heating time.

According to an embodiment of the invention, steam (preferably saturated steam at 100° C.) or air saturated by humidity or air with very high humidity level can be supplied for a predetermined time and heated water is successively supplied.

The Applicant has surprisingly found that by the use of the above-mentioned two stages of heating with two different fluids the total time for the regeneration process is much shorter than that requested by using only one fluid.

However, in further embodiments of the invention only heated water or only steam or only saturated air or air with very high humidity level is supplied to the compartments 16, 18.

From the functional diagram of FIG. 2 the operation of an embodiment of the machine 10 is clearer.

At the very first regeneration process performed by the machine 10, a heating fluid (for example cold water at a temperature of 20° C.) is inserted into the tank 60, at least in the portion 60a, which is referred also as "cold temperature portion".

The user inserts packaged portions of food into at least some of the compartments 16, 18 when these are empty.

Then, by suitably acting on the valves 70, the cold water is pumped through charge pump 68 towards the compartments 16, 18 wherein a respective portion of food has been inserted.

The water, before entering into the compartments 16 and 18, is heated through the heating means 72 provided on the conducts 69.

The valves 70, besides controlling the supply of water into the compartments 16 and 18, co-operate with the heating means 72 in order to heat the water at the desired temperature and/or to produce steam, depending on the recipe of the food inserted into each compartments 16, 18. This is achieved by suitably varying the flow rate of water which passes through the heating means 72 and the temperature of the heating means 72. Indeed, by using low flow rates in combination with high temperatures in the heating means 72, it is possible to heat the water very quickly, almost instantaneously, and also to produce steam.

Each assembly comprising each heating means 72 and the respective valve 70 of the conducts 69 constitutes a so-called "flow heater" suitable to heat different flow rates of water at different temperatures.

The operation of the heating means 72 and the respective valve 70 is automatically controlled by the control unit 20 of the machine 10, thus allowing each compartment 16 and 18 to be filled with water heated at the desired heating temperatures, and/or with steam, according to the recipes of the specific packaged portions of food inserted into the compartments 16, 18.

The filling of the different compartments 16 and 18 is generally carried out at different times when packaged portions of food of different type or with a different quantity of food are used. Indeed, the filling of the different compartments 16 and 18 depends on the desired heating times according to the recipes of the respective packaged portions of food. The control unit 20 of the machine 10 sets the time at which the filling of the different compartments 16 and 18 starts in such a way that all the packaged portions of food inserted therein are ready for warm consumption at the same time.

At the end of the regeneration process of the packaged portions of food, the water is discharged from all the compartments 16 and 18 and returned to the tank 60.

The conducts 69a, 69b, 69, 68a, 68b, 65a, 65b and 65c are used for discharging the water, by acting the discharge pump 75 and by suitably opening the valves 70, the valve 76 and at least one of the valves 66. Preferably, it is opened only the valve 66 of the conduct 65c, so as to discharge the water in the portion 60c of the tank. Indeed, the discharged water is still rather hot. The portion 60c is referred also as "hot temperature portion".

If the portion 60c is filled so that the level (i.e. free surface) of the water therein reaches the height of the inner wall 60e, the water overflows into the portion 60b through the top aperture 60g.

If the portion 60b is in turn filled so that the level of the water in the portion 60b reaches the height of the inner wall 60d, the water overflows into the portion 60a through the top aperture 60f.

The water entering into the portion 60b has a lower temperature than that in the portion 60c and has a higher temperature than that in the portion 60a. The portion 60b is referred also as "medium temperature portion".

Furthermore, in case of an excessive filling of the compartments 16, 18, the overload conduct 79 discharges the water in excess into the portion 60c.

Once the compartments 16, 18 are filled with water at the desired temperatures, the water will progressively loose its heat because of the energy getting lost in the machine 10 and the energy absorbed by the packaged portion of food. In order to maintain the desired temperatures in the compartments 16, 18 for the desired time as requested by the recipe of the packaged portions of food inserted therein, steam is added into the compartments 16, 18. Use of the steam has the advantage that, being in a gas state, agitates the water inside the compartments 16, 18 and allows the respective desired temperature to be uniformly obtained and maintained therein, with no need to use mixers or pumps or electrical resistances arranged in every portion of the compartments.

After this very first regeneration process, the three portions 60a, 60b and 60c of the tank 60 contain water at different temperatures, so that the control unit 20 can use, for the following regeneration processes, water which is at a temperature closer to the one desired for the new regeneration process, so as to require less energy from heating means 72. This allows quick heating and cost saving because of the limited energy consumption.

The portion 60a is preferably greater than each portion 60b and 60c so as cold water is always available in the tank 60 in the case that the new regeneration processes requires lower temperatures than those of the water in the portions 60b and 60c.

Clearly, the new regeneration processes are then performed by the machine 10 by operating in a manner completely analogous to that described above for the very first regeneration process, the only difference being that water having a high or medium temperature can be advantageously taken from the respective portions of the tank 60 if needed.

In another embodiment of the machine 10, at an initial stage, the water is heated by the heating means 72 so as to generate steam. The Applicant has found that, by using the above-mentioned heating means 72 having a power of about 450 W to 480 W, depending on the power supply, the water can be heated from room temperature to 100° C. (steam) in about 3 seconds and sufficient quantities of steam can be obtained to heat all the compartments 16, 18 at the same time, while limiting energy consumption to less than 3.5 kW.

Advantageously, the use of steam or saturated air or air with very high humidity level at the initial stage of each regeneration process allows an optimal texture of the food to be obtained.

Then, after said initial stage, the heating means 72 stop or reduce the heating of the water and heated water is sent into the compartments 16, 18 so as to totally submerge the packaged portions of food (this is a so called "bain-marie" stage). As stated above, the water is heated at a desired temperature according to the recipe of the packaged portions of food inserted into the compartments 16,18. Generally, the heated water has a temperature in a range between 56° C. and 93° C., so that the regeneration is performed without cooking the food and by ensuring the destruction of vegetative forms of pathogenic bacteria. Furthermore, in this way optimal results in term of taste and texture of the food are reached.

The times of the initial stage and of the following stage are automatically set by the machine 10 depending on the recipe of the packaged portions of food inserted into the compartments 16, 18.

In relation to the energy consumption of the machine 10, the Applicant has found that the mean energy consumption stays below 2.5 kW (usually between 2.3 kW and 2.5 kW) when all the six compartments 16, 18 are used, regardless of the combination of stages (steam or "bain-marie") working at the same time, and regardless of the heating temperature combination in the individual compartments 16, 18.

The heating cycle of the packaged portions of food can also be modified through the user interface 21, as described above.

The maximum packaging size of the packaged portions of food can be advantageously selected to allow a regeneration process of any food in less than 15 minutes.

Furthermore, the minimum heating temperatures and times are set in a way to reduce pathogens in foods. Thus the machine 10 raises food safety below the minimum legal requirements and it is even capable of correcting food safety concerns that could have filtered into the foods through an erroneous handling/conditioning of the foods by the user.

EXAMPLES

Below the Applicant describes specific non limiting examples of regeneration processes for two different meals, including types of food having different recipes.
1) First meal denominated: "LE MAIGRE DE LIGNE POCHÉ, embeurrée de poireaux au genièvre, beurre aux testes de citron de Menton".
   One packaged large portion of food contains: 150 g of "Maigre de ligne poché" (fish). The heating recipe includes:
      steam for 1 minute;
      water at 56° C. for 7 minutes and 30 seconds.
   One packaged large portion of food contains: 150 g of "embeurrée de poireaux" (vegetables). The heating recipe includes:
      steam for 2 minutes;
      water at 83° C. for 9 minutes.
   One packaged small portion of food contains: 45 g of "beurre aux zestes de citron" (a butter sauce with lemon). The heating recipe includes:
      no steam;
      water at 78° C. for 6 minutes.
2) Second meal denominated: "LA POULARDE DE BRESSE suprême cuit lentement, navets fondants au chutney de dattes Medjoul, jus de volaille".
   One packaged large portion of food contains: 150 g of "Suprême de poularde de Bresse" (large "Bresse" chicken breast). The heating recipe includes:
      steam for 1 minutes and 30 seconds;
      water at 63° C. for 12 minutes and 30 seconds.
   One packaged large portion of food containing two components separated through a sealing in the middle of the pack: 120 g of "navets fondants" (turnip pure) and 60 g of "chutney de dattes Medjoul" (a date chutney with special spices). The heating recipe includes:
      no steam; water at 78° C. for 8 minutes and 30 seconds.
   One packaged small portion of food containing two components separated through a sealing in the middle of the pack contains: 30 g of "jus de volaille" (a concentrated chicken broth) and 20 g (green basil sauce). The heating recipe includes:
      steam for 20 seconds;
      water at 83° C. for 4 minutes.

* * *

Of course a man skilled in the art, with the purpose of satisfying specific and contingent requirements, may carry out numerous modifications and variants to the above-described regeneration household machine for regenerating packaged cooked and subsequently cooled to chilled, ambient or frozen temperatures portions of food and to the method for regenerating packaged cooked and subsequently cooled to chilled, ambient or frozen temperatures portions of food carried out by said machine, all moreover covered by the scope of protection of the present invention as defined in the following claims.

The invention claimed is:

1. A regeneration household machine for regenerating packaged portions of food, said portions of food being cooked and subsequently cooled to either a chilled temperature, an ambient temperature, or a frozen temperature, said regeneration household machine comprising a plurality of compartments adapted to receive respective packaged portions of food and to regenerate each of said respective packaged portions of food individually and independently from one another, each compartment being in fluid communication with a conduit for feeding a heating fluid into the compartment, the respective packaged portion of food to be regenerated being inserted into any one of said plurality of compartments when said compartment is empty, a heating means associated with each of said plurality of compartments, each heating means configured to transfer heat directly to said conduit of each of the plurality of compartments in order to heat said heating fluid to a desired temperature depending on the recipe of the food of said respective packaged portions of food when said packaged portion of food is inserted into one of said empty compartments, wherein heating of the heating fluid takes place in each of said conduits before said heating fluid is injected into a respective compartment, each of said heating means heating said conduits to different desired temperatures based upon the recipe of the food of the respective packaged portion of food inserted into each of said plurality of compartments, each heating means including at least one electrovalve adapted to allow and prevent the flow of heating fluid through said conduits until the desired temperature is reached, the regeneration household machine further comprising a recognition means associated with each compartment for recognizing the recipe of the food of the respective packaged portion of food inserted into said empty compartments and a control unit configured to automatically set said regeneration household machine to operate with a predetermined heating cycle depending on the recipe of said packaged portion of food inserted into said empty compartments, and wherein each heating means and said at least one electrovalve is automatically controlled by the control unit, allowing each of said plurality of compartments to be filled with heating fluid heated to the desired temperature.

2. The regeneration household machine according to claim 1, wherein the control unit allows each compartment to be filled with heating fluid heated to a desired heating temperature according to the respective recipe of the respective packaged portions of food inserted into each compartment, the control unit adjusting the time at which each compartment is filled with heated heating fluid based upon the different desired heating temperatures to ensure that all said packaged portions of food are ready for warm consumption at the same time.

3. The regeneration household machine according to claim 1, wherein said heating fluid comprises water, and said heating feeding conduit associated with each compartment comprises a first electric resistance heater adapted to heat said water at a desired temperature below 100° C. and a second electric resistance heater adapted to produce steam from said water, said at least one electrovalve associated with each heating means being adapted to allow said compartment to be fed either with said water heated by said first electric resistance heater or with said steam produced by said second electric resistance heater depending on the recipe of the food of the respective packaged portion of food inserted therein.

4. The regeneration household machine according to claim 1, further comprising a water tank arranged upstream of said conduits for supplying water to said conduits for injection into said compartments.

5. The regeneration household machine according to claim 4, wherein said water tank comprises at least one wall dividing the water tank in at least one portion for cold water and at least one portion for hotter water.

6. The regeneration household machine according to claim 1, wherein said control unit comprises a user interface by which an user can modify said predetermined heating cycle after said recognition means have recognised the specific packaged portion of food inserted into said compartment.

7. The regeneration household machine according to claim 1, comprising one said compartment having a first volume for receiving packaged large portions of food and said compartment having a smaller volume for receiving packaged smaller portions of food.

* * * * *